United States Patent
Ps et al.

(10) Patent No.: US 12,137,637 B2
(45) Date of Patent: Nov. 12, 2024

(54) PANEL COMPRESSION SYSTEM FOR BALER IMPLEMENT

(71) Applicant: DEERE & COMPANY, Moline, IL (US)

(72) Inventors: Satyanarayana Ps, Pune (IN); Sanjeev M. Hallale, Pune (IN); Nikhil Kulkarni, Pune (IN)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/295,347

(22) Filed: Apr. 4, 2023

(65) Prior Publication Data

US 2024/0334878 A1 Oct. 10, 2024

(51) Int. Cl.
- A01F 15/00 (2006.01)
- A01F 15/04 (2006.01)
- A01F 15/08 (2006.01)

(52) U.S. Cl.
CPC .......... *A01F 15/046* (2013.01); *A01F 15/042* (2013.01); *A01F 15/0841* (2013.01)

(58) Field of Classification Search
CPC .............................. A01F 15/046; A01F 17/071
See application file for complete search history.

(56) References Cited

U.S. PATENT DOCUMENTS

| | | | |
|---|---|---|---|
| 4,037,528 A | 7/1977 | White et al. | |
| 4,788,901 A * | 12/1988 | Klinner | A01F 15/046 100/255 |
| 10,945,377 B2 | 3/2021 | Roth et al. | |
| 11,051,455 B2 | 7/2021 | Monbaliu et al. | |
| 2012/0067229 A1 * | 3/2012 | Lanning | B30B 9/301 100/8 |
| 2016/0082683 A1 * | 3/2016 | Lanning | A01F 15/046 100/240 |
| 2018/0098501 A1 * | 4/2018 | Kraus | A01F 15/042 |
| 2018/0098502 A1 * | 4/2018 | Kraus | A01F 15/042 |
| 2018/0125010 A1 * | 5/2018 | Gresch | A01D 89/002 |
| 2019/0090429 A1 * | 3/2019 | Gresch | A01F 15/005 |
| 2019/0111646 A1 * | 4/2019 | Pasa | B30B 15/041 |
| 2019/0246566 A1 * | 8/2019 | Roth | A01F 15/0825 |
| 2020/0214214 A1 * | 7/2020 | Bozarth | G01B 5/02 |
| 2020/0214221 A1 * | 7/2020 | Olander | B60K 35/00 |
| 2021/0243956 A1 * | 8/2021 | Monbaliu | A01F 15/046 |
| 2022/0248608 A1 * | 8/2022 | Grady | A01D 85/005 |

\* cited by examiner

Primary Examiner — Eyamindae C Jallow (57) ABSTRACT

A baler implement includes an upper compression panel and a first side compression panel. A compression frame is disposed around the upper compression panel and the first side compression panel. A panel support structure includes a top portion positioned proximate the upper compression panel, and a first side portion attached to the top portion and positioned proximate the left side compression panel. An actuator interconnects the compression frame and the panel support structure. The actuator is operable to extend to move the panel support structure and the upper compression panel in a first vertical direction along a first compression axis. A first wedging system includes a wedge for converting movement of the first side portion in the first vertical direction along the first compression axis into movement of the first side compression panel in a first horizontal direction along a second compression axis.

19 Claims, 9 Drawing Sheets

PANEL COMPRESSION SYSTEM FOR BALER IMPLEMENT

TECHNICAL FIELD

The disclosure generally relates to a baler implement, and more particularly to a baler implement having a compression chamber configured to form a bale having a parallelepiped shape.

BACKGROUND

Agricultural balers gather, compress, and shape crop material into a bale. There are different types of balers which create rectangular or square bales, or cylindrical or round bales. One exemplary baler is often referred to as a large square baler. Large square balers have been used in crop harvesting for many years, and utilize a compression system including a gearbox with a crank arm and connecting rod which are attached to a reciprocating plunger. During each rotation of the crank arm, the reciprocating plunger compresses the crop in a baling or compression chamber as the plunger moves towards the rear of the baler.

The compression chamber is generally formed by compression panels, e.g., an upper compression panel, a first side compression panel, a second side compression panel and a lower compression panel. The baler implement may include a compression system operable to urge one or more of the compression panels inward toward a center of the compression chamber. Doing so increases the pressure applied against the crop material disposed within the compression chamber, which in turn increases the resistance the crop material is able to apply against the plunger. Increasing the resistance against the plunger increases the density of the formed bale. Accordingly, the compression system may increase the density of the bale by pressing the compression panels inward. Typically, the compression system includes a hydraulic cylinder operable to extend to press against one or more of the compression panels.

SUMMARY

A baler implement for forming a bale having a parallelepiped shape is provided. The baler implement includes an upper compression panel and a first side compression panel both partially forming a compression chamber having a central longitudinal axis. A compression frame is disposed around the upper compression panel and the first side compression panel. Both the upper compression panel and the first side compression panel are moveable relative to the compression frame. A panel support structure includes a top portion positioned proximate the upper compression panel, and a first side portion attached to the top portion and positioned proximate the left side compression panel. An actuator interconnects the compression frame and the panel support structure. The actuator is operable to extend to move the panel support structure and the upper compression panel in a first vertical direction along a first compression axis. A first wedging system interconnects the first side compression panel and the first side portion of the panel support structure. The first wedging system includes a wedge that is operable to convert movement of the first side portion of the panel support structure in the first vertical direction along the first compression axis into movement of the first side compression panel in a first horizontal direction along a second compression axis.

In one aspect of the disclosure, the baler implement further includes a first brace that is attached to the compression frame. The first brace is positioned adjacent to and outboard of the first side portion of the panel support structure relative to the central longitudinal axis of the compression chamber. The first brace limits movement of the first side portion of the panel support structure in a second horizontal direction along the second compression axis.

In one implementation of the disclosure, the first side portion may include a brace roller rotatably attached to the first side portion. The brace roller may be positioned for rolling engagement against the first brace as the first side portion moves along the first compression axis.

In one implementation of the disclosure, the wedge of the first wedging system includes a link interconnecting the first side portion and the first side compression panel. The link includes an outboard end and an inboard end. The outboard end of the link is pivotably coupled to the first side portion of the panel support structure. The outboard end of the link may pivot about a connection and moves with the first side portion of the panel support structure along the first compression axis. The inboard end of the link is pivotably coupled to the first side compression panel, and is fixed in position along the first compression axis. In other words, the inboard end of the link may pivot about a connection, but does not move along the first compression axis. The link extends along a central link axis between the outboard end and the inboard end thereof. The link axis is angled relative to both the first compression axis and the second compression axis. The inboard end of the link may be positioned vertically lower than the outboard end of the link along the first compression axis. As the first side portion and the outboard end of the link move in the first vertical direction along the first compression axis, with the inboard end of the link restrained against movement along the first compression axis, the link is wedged between the first side portion and the first side compression portion. With the inboard end of the link restrained against movement along the first compression axis and the first side portion restrained against the first brace, the inboard end of the link is forced to move in the first horizontal direction along the second compression axis as the outboard end of the link moves in the first vertical direction along the first compression axis, thereby forcing the first side compression panel inward into the compression chamber.

In one implementation of the disclosure, the first side portion of the panel support structure may be rigidly attached to the top portion of the panel support structure. However, in other implementations of the disclosure, the first side portion of the panel support structure may be rotatably connected to the top portion of the panel support structure.

In one implementation of the disclosure, the wedge of the first wedging system may include a ramp presenting a wedge surface against which the first side portion engages. Relative movement between the first side portion and the ramp in the first vertical direction along the first compression axis moves the first side compression panel in the first horizontal direction along the second compression axis. The first wedging system may include a ramp roller disposed between and interconnecting the ramp and the first side portion of the panel support structure to reduce friction therebetween. In one implementation of the disclosure, the ramp may be attached to the first side compression panel. However, in other implementations of the disclosure, the ramp may be attached to the first brace.

In one implementation of the disclosure, the baler implement may further include a second side compression panel moveable relative to the compression frame and cooperating with the upper compression panel and the first side compression panel to form the compression chamber. The panel support structure may further include a second side portion attached to the top portion and positioned proximate the second side compression panel. The baler implement may further include a second wedging system interconnecting the second side compression panel and the second side portion of the panel support structure. The second wedging system includes a wedge operable to convert movement of the second side portion of the panel support structure in the first vertical direction along the first compression axis into movement of the second side compression panel in a second horizontal direction along the second compression axis. The second wedging system may be configured similar to the first wedging system, e.g., the second wedging system may be a mirror image of the first wedging system.

In one aspect of the disclosure, the actuator is positioned vertically above the upper compression panel and biases against the compression frame and the top portion of the panel support structure to move the panel support structure along the first compression axis. In one implementation, the actuator may include but is not limited to, a hydraulic cylinder operable to extend and retract in response to fluid pressure. The actuator may be positioned to extend in a direction that is substantially transverse to the central longitudinal axis of the compression chamber in a substantially vertical orientation relative to the central longitudinal axis of the compression chamber.

Accordingly, the baler implement described herein provides a simple yet strong, robust and effective compression system for compressing the compression panels inward into the compression chamber, with a minimum number of actuators, e.g., hydraulic cylinders, thereby minimizing the cost of the compression system.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
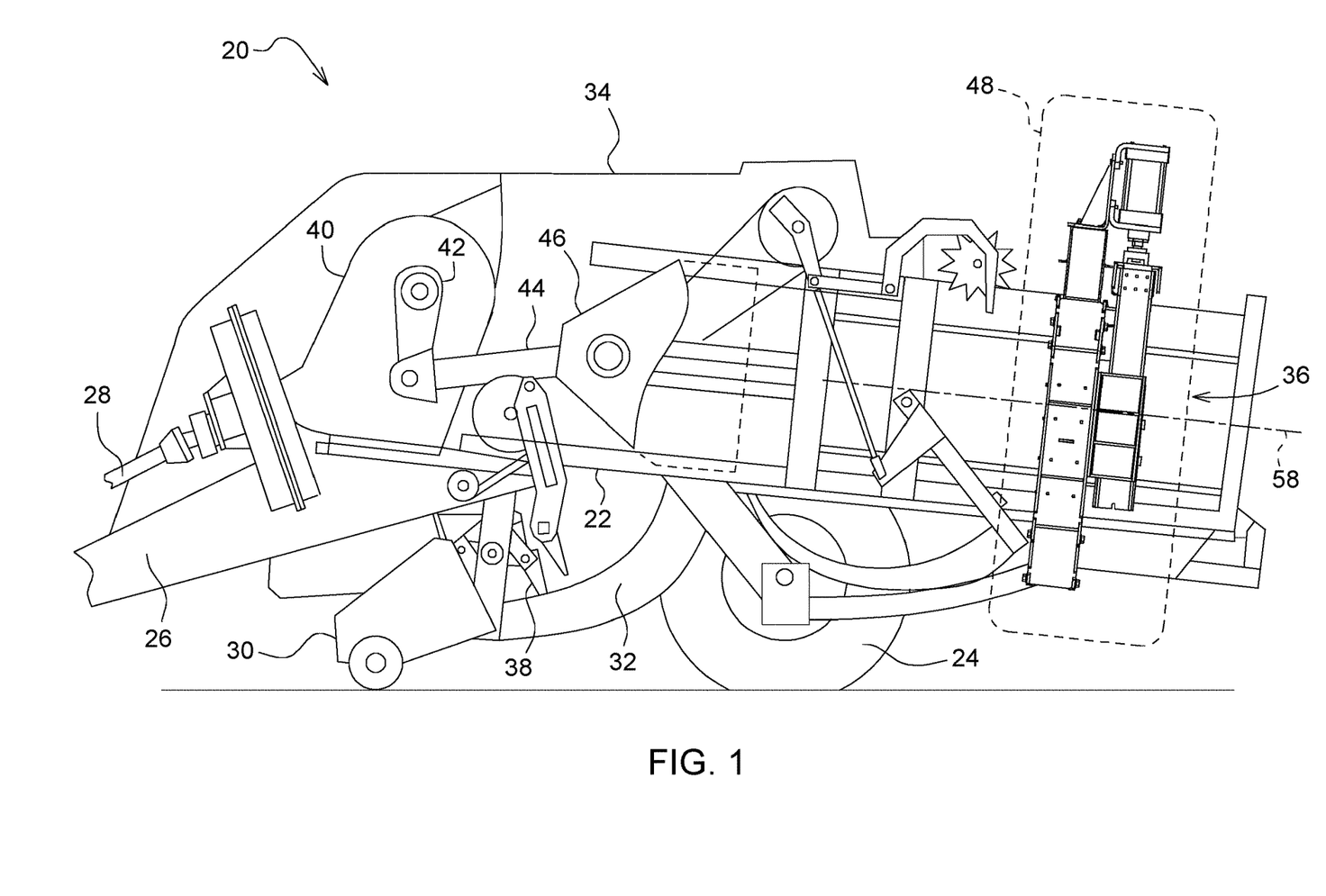
FIG. 1 is a schematic side view of a baler implement.

Referring to the Figures, wherein like numerals indicate like parts throughout the several views, a baler implement is generally shown at 20 in FIG. 1. Referring to FIG. 1 the baler implement 20 is shown as a large square baler. However, it should be appreciated that the teachings of this disclosure may be applied to other baler implement 20 platforms, and are not limited to the exemplary embodiment of the large square baler shown in the Figures and described herein.

A traction unit, such as but not limited to a tractor, may be coupled to the baler implement 20 for pulling and powering the baler implement 20. However, it should be appreciated that in other embodiments the baler implement 20 may be self-propelled. The baler implement 20 may move across a field to gather and process crop material to form a bale. The baler implement 20 may then eject the formed bale from the rear of the baler implement 20.

Referring to FIG. 1, the example implementation of the baler implement 20 includes a main frame 22, ground engaging devices 24, such as but not limited to wheels, tracks, slides, etc., a hitch 26 for attachment to the tractor or other vehicle, and an input shaft 28, such as a power-take-off (PTO) shaft, which can receive rotational power from a power source, such as the tractor. The baler implement 20 includes a pick-up mechanism 30 which gathers crop material from the ground surface and feeds it into a pre-compression passageway 32 of the baler implement 20. The pick-up mechanism 30 may include various pick-up apparatus including, but not limited to, tines, forks, augers, conveyors, baffles, a cutter or pre-cutter assembly, or any combination of the preceding. The baler implement 20 includes a housing 34 or body, which generally shields various internal components of the baler implement 20. The body includes multiple compression panels 50, 52, 54, 56 that form a compression chamber 36 (shown in FIG. 2) used for forming the bale into a parallelepiped shape. A feeder system 38 moves the crop material from the pre-compression passageway 32 into the compression chamber 36 to form the bale.

The input shaft 28 or PTO shaft is connected to an input of a transmission 40 to provide rotational power to the baler implement 20 from the tractor or other associated vehicle or power source. The transmission 40 includes a gearbox which converts the rotational motion of the input shaft 28 along a generally longitudinal axis of the baler implement 20 to an output of the transmission 40 having a rotational motion along a generally transverse axis of the baler implement 20.

The baler implement 20 includes a crank arm 42 connected to the output of the transmission 40. A connecting link 44 interconnects the crank arm 42 and a plunger 46. The crank arm 42 rotates based upon the output of the transmission 40 and the plunger 46 moves in a reciprocal motion within the compression chamber 36 as the crank arm 42 rotates. The plunger 46 extends into the compression chamber 36, thereby compressing the crop material within the compression chamber 36, and then at least partially retracts from the compression chamber 36 to allow more crop material to enter the compression chamber 36.

With the plunger 46 in a fully retracted position, a charge of crop material may be moved from the pre-compression passageway 32 into the compression chamber 36, whereafter the plunger 46 moves to a fully extended position to compress the crop material. Each charge of the crop material forms a flake of the bale. Multiple flakes are accumulated together within the compression chamber 36 to form the bale. The plunger 46 compresses the crop material against the previously formed flakes disposed within the compression chamber 36. As such, the previously formed flakes provide the resistance against which the plunger 46 compresses the new crop material against. In order to increase the resistance against the plunger 46, the baler implement 20 may include a compression system 48 to compress the compression panels 50, 52, 54, 56 of the compression chamber 36 inward against the previously formed flakes disposed within the compression chamber 36.

As noted above, with reference to FIG. 2, the compression chamber 36 is formed by a plurality of compression panels 50, 52, 54, 56. The plurality of compression panels 50, 52, 54, 56 may include an upper compression panel 50, a first side compression panel 52, a second side compression panel 54, and a lower compression panel 56. The compression chamber 36 defines a central longitudinal axis 58. The central longitudinal axis 58 of the compression chamber 36 may be defined as a horizontal and vertical centerline of the compression chamber 36, and defines the path of the bale as the bale is pressed through the compression chamber 36. The upper compression panel 50, the first side compression panel 52, the second side compression panel 54, and the lower side compression panel may be constructed for rigid components and materials as is understood by those skilled in the art. The size, shape and construction of the compression panels 50, 52, 54, 56 are understood by those skilled in the art, are not pertinent to the teachings of this disclosure, and are therefore not described in greater detail herein.

Figure 2:
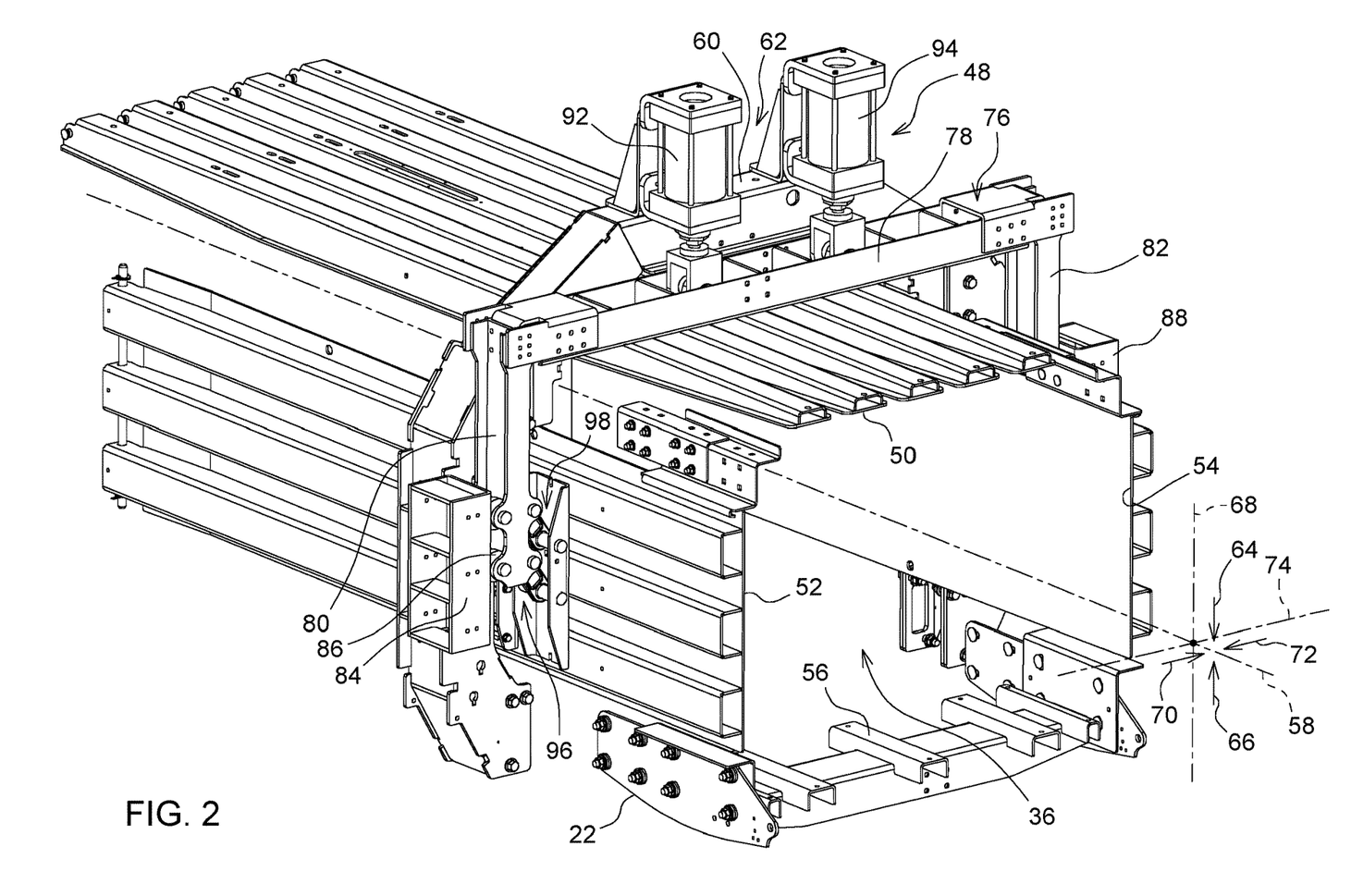
FIG. 2 is a schematic perspective view of a compression chamber of the baler implement.
Figure 3:
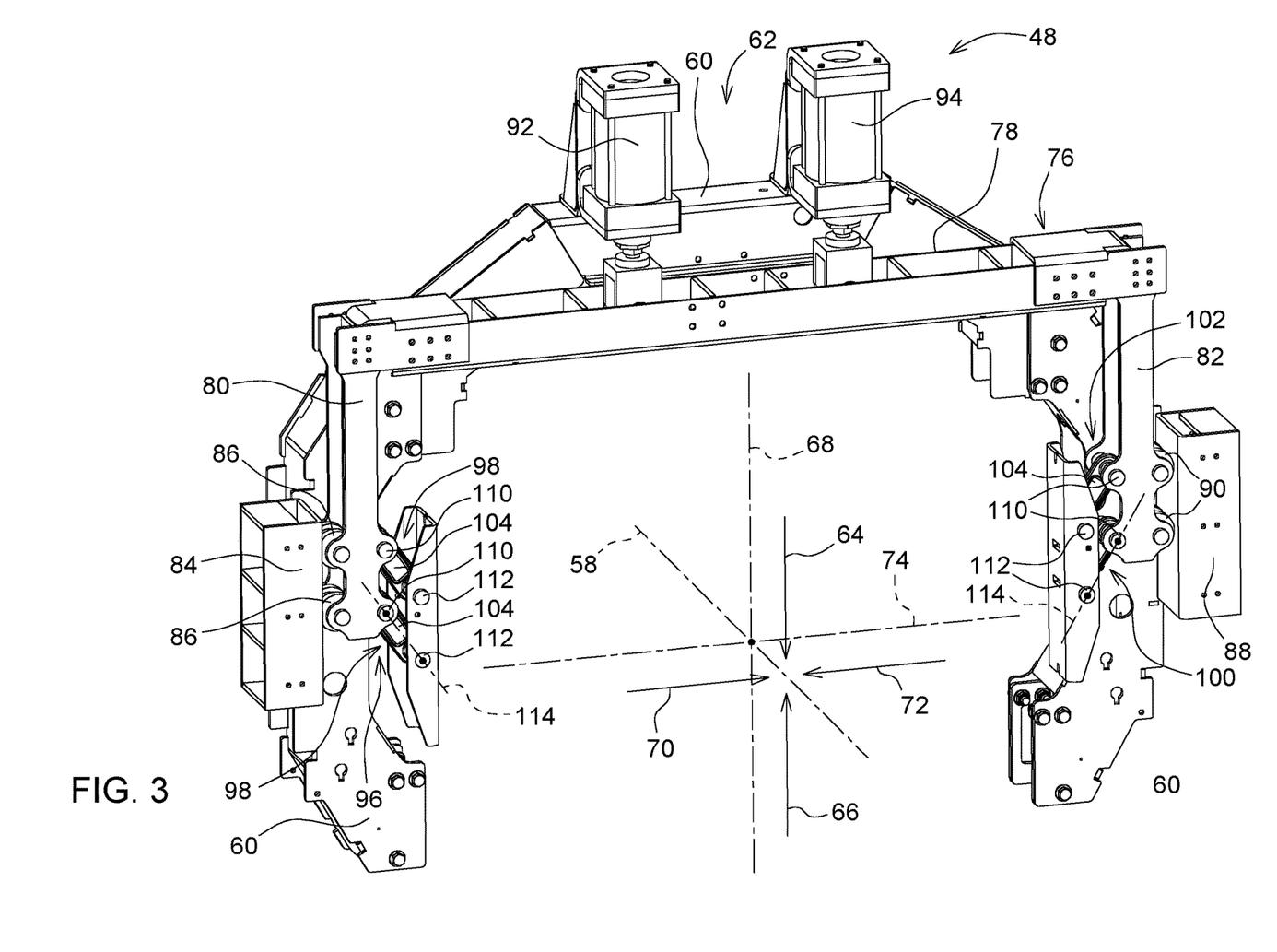
FIG. 3 is a schematic perspective view of a compression system of the baler implement.

Referring to FIGS. 2-3, a compression frame 60 is disposed around the upper compression panel 50, the first side compression panel 52 and the second side compression panel 54. The compression frame 60 is rigidly attached to the main frame 22 of the baler implement 20, and forms a hoop surrounding the upper compression panel 50 the first side compression panel 52, the second side compression panel 54. The compression frame 60 is fixed in position relative to the main frame 22 of the baler implement 20. The compression frame 60 is sized and configured to provide a rigid framework against which one or more actuators 62 (described in greater detail below) may press against without moving or deflecting the compression frame 60.

The upper compression panel 50 and at least one of the first side compression panel 52 and the second side compression panel 54 are moveable relative to the compression frame 60. In the example implementation described herein and shown in the Figures, both the first side compression panel 52 and the second side compression panel 54 are movable relative to the compression frame 60. Additionally, although not shown in the example implementation described herein, the lower compression panel 56 may be configured to be moveable relative to the compression frame 60 as well.

The upper compression panel 50 is moveable relative to the compression frame 60 in both a first vertical direction 64 and a second vertical direction 66 along a first compression axis 68. The first compression axis 68 is substantially orthogonal relative to the central longitudinal axis 58 of the compression chamber 36 and extends generally vertically. The first vertical direction 64 along the first compression axis 68 is defined herein as a vertically downward direction toward a ground surface. With respect to the upper compression panel 50, the first vertical direction 64 is generally inward toward the central longitudinal axis 58 of the compression chamber 36. The second vertical direction 66 along the first compression axis 68 is defined herein as a vertically upward direction away from the ground surface. With respect to the upper compression panel 50, the second vertical direction 66 is generally outward away from the central longitudinal axis 58 of the compression chamber 36. If the lower compression panel 56 is configured for movement, the lower compression chamber 36 may also be moveable relative to the compression frame 60 in both the first vertical direction 64 and the second vertical direction 66 along the first compression axis 68.

In the example implementation shown in the Figures and described herein, both the first side compression panel 52 and the second side compression panel 54 are moveable relative to the compression frame 60 in both a first horizontal direction 70 and a second horizontal direction 72 along a second compression axis 74. The first side compression panel 52 and the second side compression panel 54 are generally fixed in position relative to and do not move along the first compression axis 68. The upper compression panel 50 and the lower compression panel 56 are generally fixed in position relative to and do not move along the second compression axis 74.

The second compression axis 74 is substantially orthogonal relative to the central longitudinal axis 58 of the compression chamber 36 and extends generally horizontally. The first horizontal direction 70 along the second compression axis 74 is defined herein as a horizontally rightward direction as viewed on the page of the Figures. With respect to the first side compression panel 52, the first horizontal direction 70 is laterally inward toward the central longitudinal axis 58 of the compression chamber 36. With respect to the second side compression panel 54, the first horizontal direction 70 is laterally outward away from the central longitudinal axis 58 of the compression chamber 36. The second horizontal direction 72 along the second compression axis 74 is defined herein as a horizontally leftward direction as viewed on the page of the Figures. With respect to the first side compression panel 52, the second horizontal direction 72 is laterally outward away from the central longitudinal axis 58 of the compression chamber 36. With respect to the second side compression panel 54, the second horizontal direction 72 is laterally inward toward the central longitudinal axis 58 of the compression chamber 36.

Referring to FIGS. 2-3, the baler implement 20 includes a panel support structure 76 disposed about an outboard side of the upper compression panel 50, the left side compression panel, and the right side compression panel. As used herein, the terms "outboard" and "inboard" should be understood as a positional descriptors relative to the central longitudinal axis 58 of the compression chamber 36. An outboard position is located farther from the central longitudinal axis 58 than an inboard position. In contrast, an inboard position n is located nearer the central longitudinal axis 58 than an outboard position.

The panel support structure 76 includes a top portion 78 positioned proximate the upper compression panel 50, a first side portion 80 attached to the top portion 78 and positioned proximate the left side compression panel, and a second side portion 82 attached to the top portion 78 and positioned proximate the second side compression panel 54. In the example implementation shown in FIGS. 2-5, the first side portion 80 of the panel support structure 76 and the second side portion 82 of the panel support structure 76 are both rigidly attached to the top portion 78 of the panel support structure 76. The panel support structure 76 is constructed of rigid materials and components sized, shaped, and configured to transmit forces sufficient to move one or more of the compression panels 50, 52, 54, 56 inward toward the central longitudinal axis 58 of the compression chamber 36 to compress the bale within the compression chamber 36.

Referring to FIG. 3, a first brace 84 is attached to the compression frame 60 and is positioned adjacent to and outboard of the first side portion 80 of the panel support structure 76 relative to the central longitudinal axis 58 of the compression chamber 36. The first brace 84 limits movement of the first side portion 80 of the panel support structure 76 in the second horizontal direction 72 along the second compression axis 74. The first brace 84 provides a reactionary member against the first side portion 80 of the panel support structure 76. The first brace 84 is sized and constructed of rigid materials and components capable of preventing laterally movement of the first side portion 80 of the panel support structure 76 in the second horizontal direction 72 along the second compression axis 74 during operation described in greater detail below.

The first side portion 80 may include a brace roller 86 that is rotatably attached to the first side portion 80. The brace roller 86 of the first side portion 80 is positioned for rolling engagement against the first brace 84 as the first side portion 80 moves along the first compression axis 68. The brace roller 86 of the first side portion 80 is operable to reduce friction between the first brace 84 and the first side portion 80 as the first side portion 80 moves relative to the first brace 84. In an alternative implementation, a slider manufactured from a low friction material may be substituted for the brace roller 86 of the first side portion 80.

Referring to FIG. 3, a second brace 88 is attached to the compression frame 60 and is positioned adjacent to and outboard of the second side portion 82 of the panel support structure 76 relative to the central longitudinal axis 58 of the compression chamber 36. The second brace 88 limits movement of the second side portion 82 of the panel support structure 76 in the first horizontal direction 70 along the second compression axis 74. The second brace 88 provides a reactionary member against the second side portion 82 of the panel support structure 76. The second brace 88 is sized and constructed of rigid materials and components capable of preventing laterally movement of the second side portion 82 of the panel support structure 76 in the first horizontal direction 70 along the second compression axis 74 during operation described in greater detail below.

The second side portion 82 may include a brace roller 90 that is rotatably attached to the second side portion 82. The brace roller 90 of the second side portion 82 is positioned for rolling engagement against the second brace 88 as the second side portion 82 moves along the first compression axis 68. The brace roller 90 of the second side portion 82 is operable to reduce friction between the second brace 88 and the second side portion 82 as the second side portion 82 moves relative to the second brace 88. In an alternative implementation, a slider manufactured from a low friction material may be substituted for the brace roller 90 of the second side portion 82.

Referring to FIG. 3, the actuator 62 interconnects the compression frame 60 and the panel support structure 76. The actuator 62 is operable to extend to move the panel support structure 76 and the upper compression panel 50 in the first vertical direction 64 along the first compression axis 68. The actuator 62 is operable to retract to move the panel support structure 76 and the upper compression panel 50 in the second vertical direction 66 along the first compression axis 68. As described above, the panel support structure 76 includes the top portion 78, the left side portion attached to the top portion 78, and the right side portion attached to the top portion 78. The panel support structure 76, including the top portion 78, the left side portion and the right side portion, moves with the actuator 62 as the actuator 62 extends and retracts.

The actuator 62 is positioned vertically above the upper compression panel 50, and interconnects the compression frame 60 and the top portion 78 of the panel support structure 76. The actuator 62 is positioned to extend in a direction that is substantially transverse to the central longitudinal axis 58 of the compression chamber 36 in a substantially vertical orientation relative to the central longitudinal axis 58 of the compression chamber 36, i.e., along the first compression axis 68. During extension and retraction, the actuator 62 biases against the compression frame 60 and the top portion 78 of the panel support structure 76. As the compression frame 60 is fixedly attached to the main frame 22 and is fixed in position relative to the main frame 22 of the baler implement 20, extension and retraction of the actuator 62 moves the panel support structure 76.

In the example implementation described herein, the actuator 62 includes a hydraulic cylinder operable to extend and retract in response to fluid pressure. However, it should be appreciated that the actuator 62 may include some other device capable of extending and retracting in response to some other form of control signal. For example, the actuator 62 may include, but is not limited to, an electric actuator 62 operable to extend and retract in response to an electric controls signal, or a pneumatic actuator 62 operable to extend and retract in response to a pneumatic control signal. Additionally, it should be appreciated that the actuator 62 may include other components, linkage systems, force multiplying mechanical systems, etc. to generate the linear movement during extension and retraction. In the example implementation shown in the Figures, the actuator 62 includes a first actuator 92 and a second actuator 94 arranged in tandem. However, it should be appreciated that the actuator 62 may include only a single actuator, or more than the exemplary two actuators 92, 94 shown in the Figures and described herein.

Figure 4:
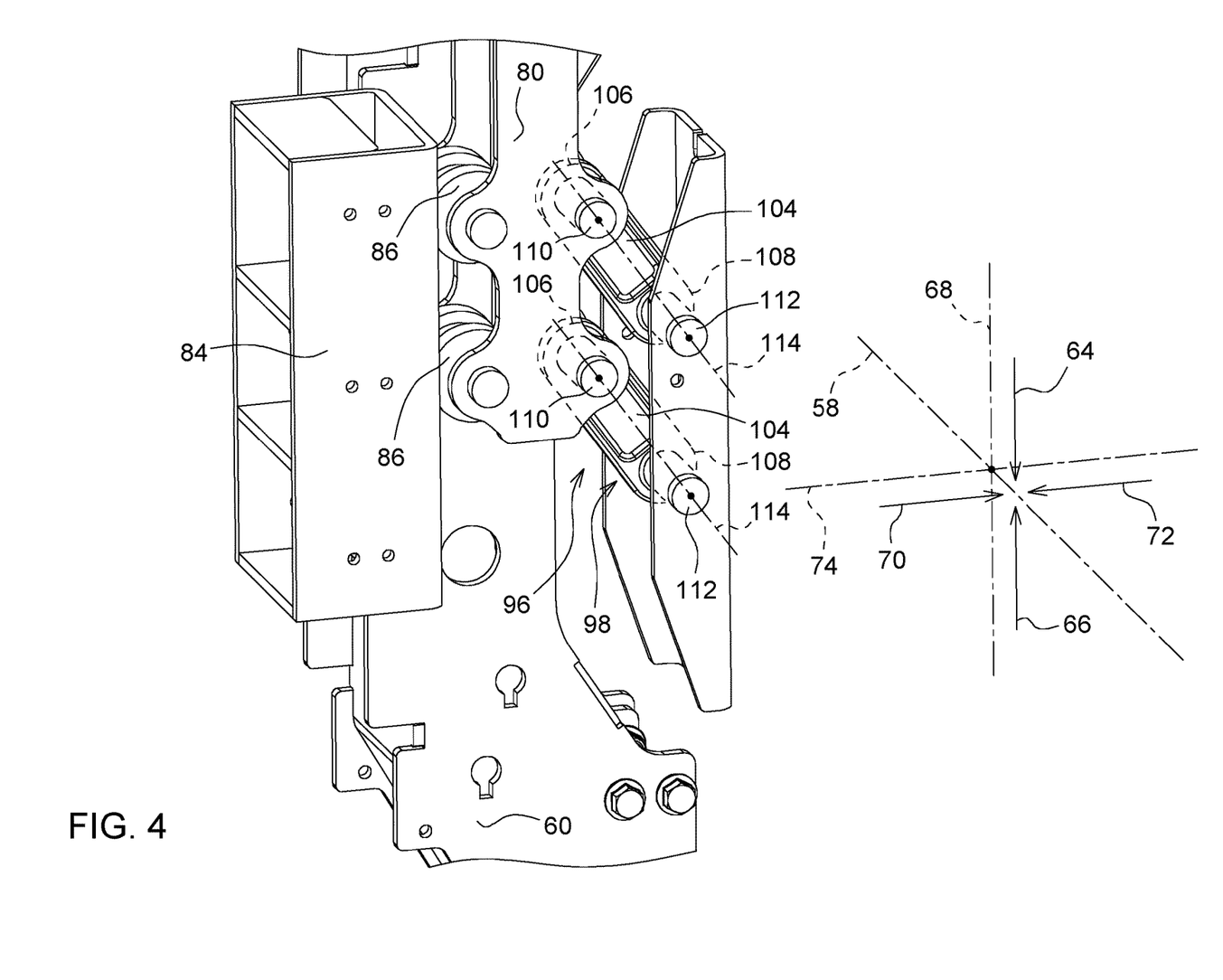
FIG. 4 is an enlarged schematic perspective view of a first embodiment of a wedging system of the baler implement.
Figure 5:
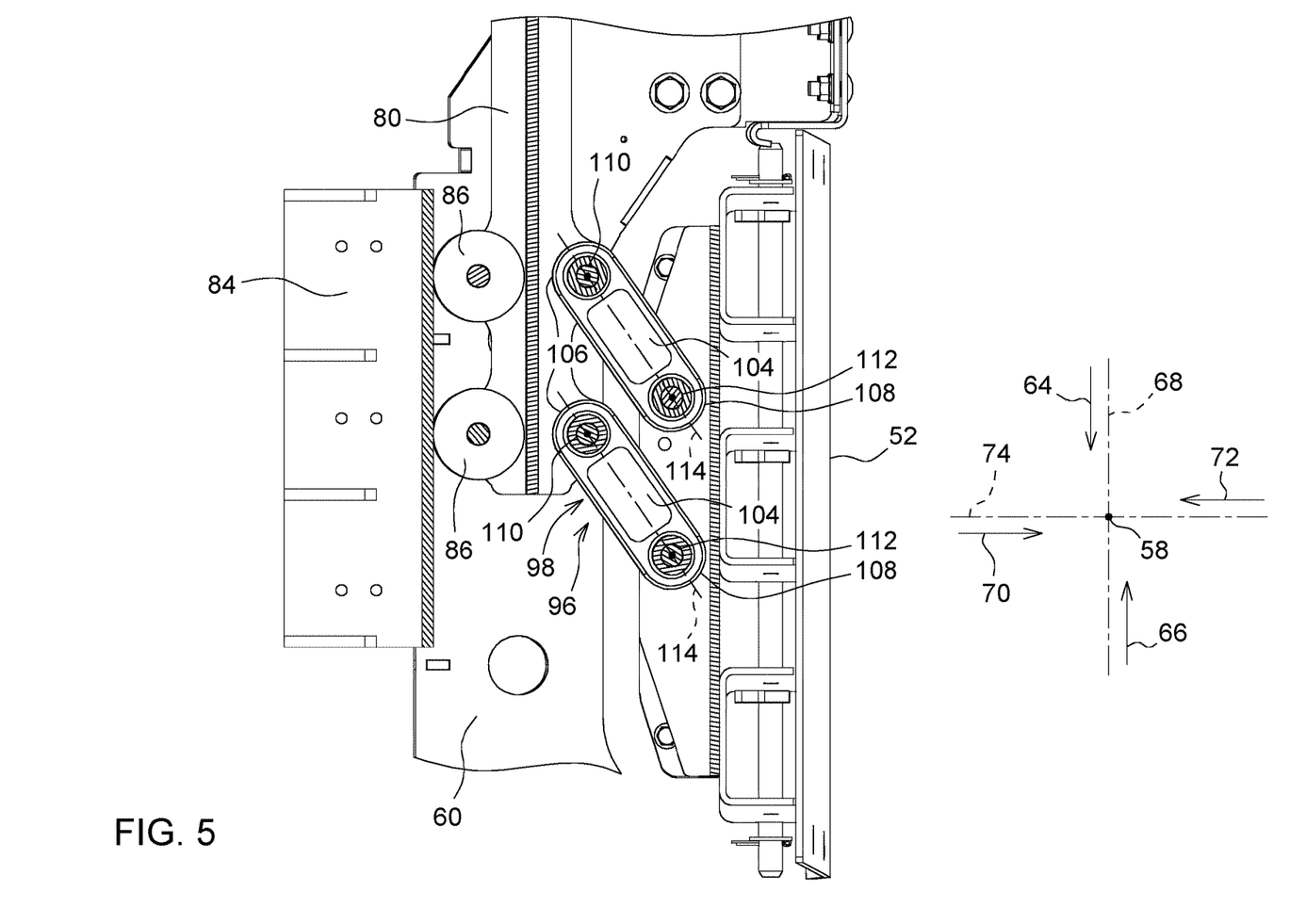
FIG. 5 is an enlarged side view of the wedging system shown in FIG. 4.

Referring to FIGS. 4-5, a first wedging system 96 interconnects the first side compression panel 52 and the first side portion 80 of the panel support structure 76. The first wedging system 96 includes a wedge 98 operable to convert movement of the first side portion 80 of the panel support structure 76 in the first vertical direction 64 along the first compression axis 68 into movement of the first side compression panel 52 in the first horizontal direction 70 along the second compression axis 74. A second wedging system 100 interconnects the second side compression panel 54 and the second side portion 82 of the panel support structure 76. The second wedging system 100 includes a wedge 102 operable to convert movement of the second side portion 82 of the panel support structure 76 in the first vertical direction 64 along the first compression axis 68 into movement of the second side compression panel 54 in the second horizontal direction 72 along the second compression axis 74.

The first wedging system 96 and the second wedging system 100 may be constructed as mirror images of each other. While only the first wedging system 96 is described in detail herein, it should be appreciated that the teachings of the first wedging system 96 may be applied to the second wedging system 100, and that the components and operation of the second wedging system 100 are mirrored copies to that described of the first wedging system 96.

Referring to FIGS. 2-5 a first implementation of the first wedging system 96 is generally shown. In the implementation shown in FIGS. 2-5, the wedge 98 of the first wedging system 96 includes a link 104 interconnecting the first side portion 80 and the first side compression panel 52. The link 104 includes an outboard end 106 and an inboard end 108. The outboard end 106 of the link 104 is pivotably coupled to the first side portion 80 of the panel support structure 76, but is fixed in position along the second compression axis 74. In other words, the outboard end 106 of the link 104 may pivot about an outboard connection 110, but does not move along the second compression axis 74. However, the outboard end 106 of the link 104 is moveable with the first side portion 80 of the panel support structure 76 along the first compression axis 68. The inboard end 108 of the link 104 is pivotably coupled to the first side compression panel 52, and is fixed in position along the first compression axis 68. In other words, the inboard end 108 of the link 104 may pivot about an inboard connection 112, but does not move along the first compression axis 68. However, the inboard end 108 of the link 104 is moveable with the first side compression panel 52 along the second compression axis 74.

The link 104 extends along a central link axis 114 between the outboard end 106 and the inboard end 108 thereof. The link 104 axis is angled relative to both the first compression axis 68 and the second compression axis 74. The inboard end 108 of the link 104 may be positioned vertically lower than the outboard end 106 of the link 104 along the first compression axis 68. As the first side portion 80 and the outboard end 106 of the link 104 move in the first vertical direction 64 along the first compression axis 68, with the inboard end 108 of the link 104 restrained against movement along the first compression axis 68, the link 104 is wedged between the first side portion 80 and the first side compression portion. With the inboard end 108 of the link 104 restrained against movement along the first compression axis 68 and the first side portion 80 restrained against the first brace 84, the inboard end 108 of the link 104 is forced to move in the first horizontal direction 70 along the second compression axis 74 as the outboard end 106 of the link 104 moves in the first vertical direction 64 along the first compression axis 68, thereby forcing the first side compression panel 52 inward into the compression chamber 36.

Figure 6:
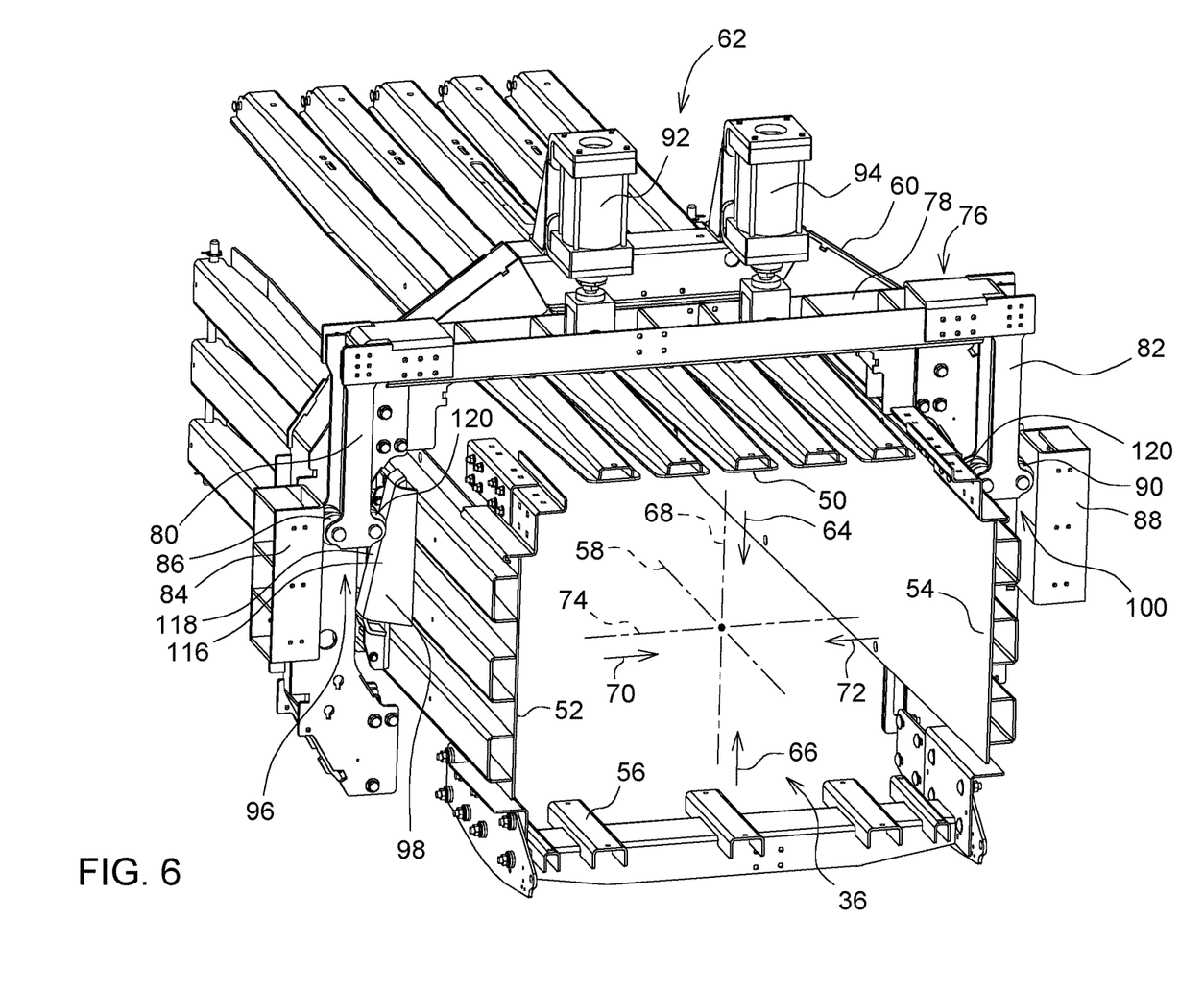
FIG. 6 is a schematic perspective view of a second embodiment of the wedging system of the baler implement.
Figure 7:
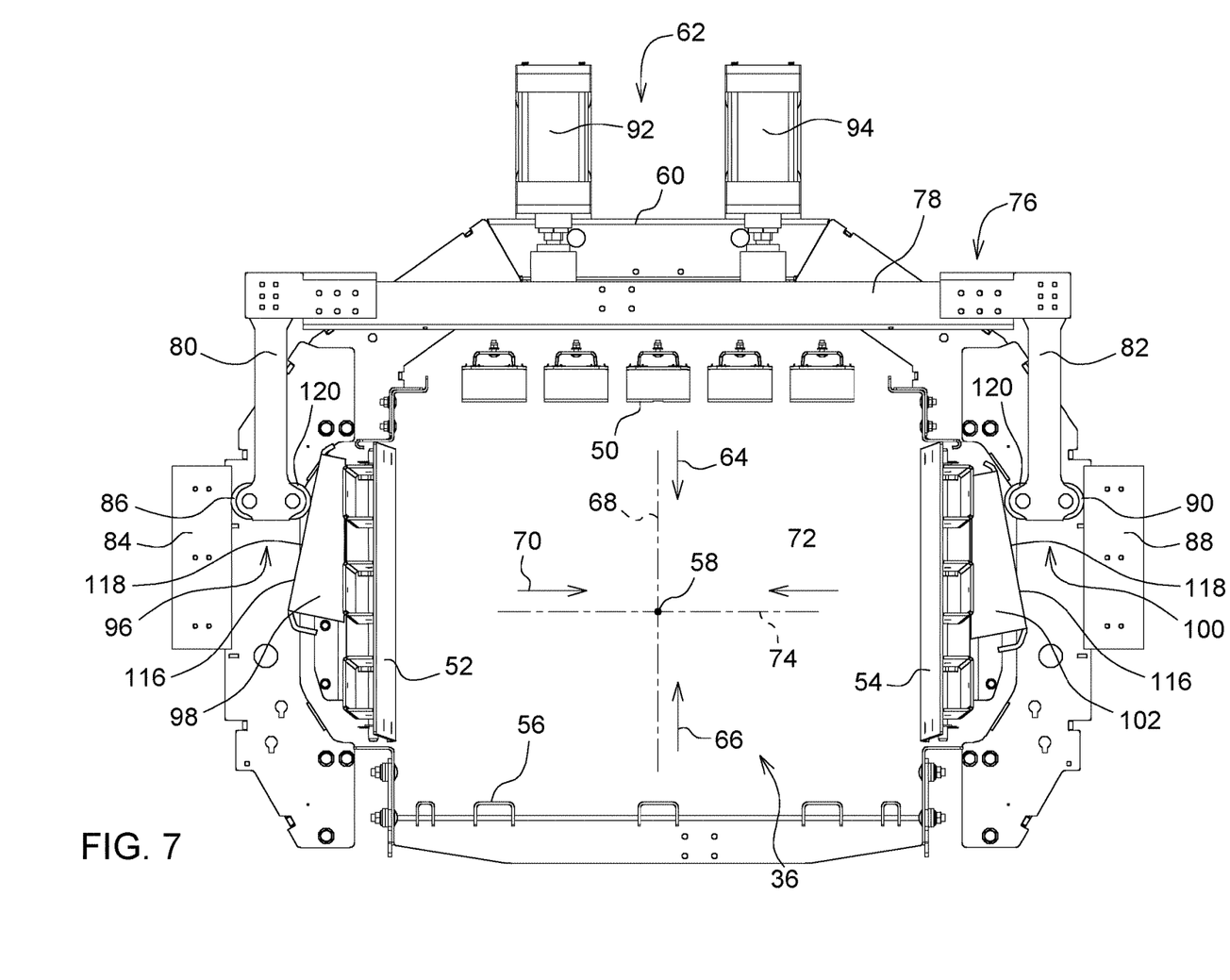
FIG. 7 is a schematic side view of the wedging system shown in FIG. 6.

Referring to FIGS. 6-7 a second implementation of the first wedging system 96 is generally shown. In the implementation shown in FIGS. 6-7, the wedge 98 of the first wedging system 96 includes a ramp 116 presenting a wedge surface 118 against which the first side portion 80 engages. The ramp 116 is attached to the first side compression panel 52. The wedge surface 118 increases a distance between the wedge surface 118 and the first side compression panel 52 in the first vertical direction 64 along the first compression axis 68. Relative movement between the first side portion 80 and the ramp 116 in the first vertical direction 64 along the first compression axis 68 moves the first side compression panel 52 in the first horizontal direction 70 along the second compression axis 74. The first side portion 80 of the panel support structure 76 may include a ramp roller 120 rotatably attached to the first side portion 80 and positioned for engaging the wedge surface 118 of the ramp 116 in rolling engagement. As such, the ramp roller 120 may be disposed between and interconnect the ramp 116 and the first side portion 80 of the panel support structure 76.

Figure 8:
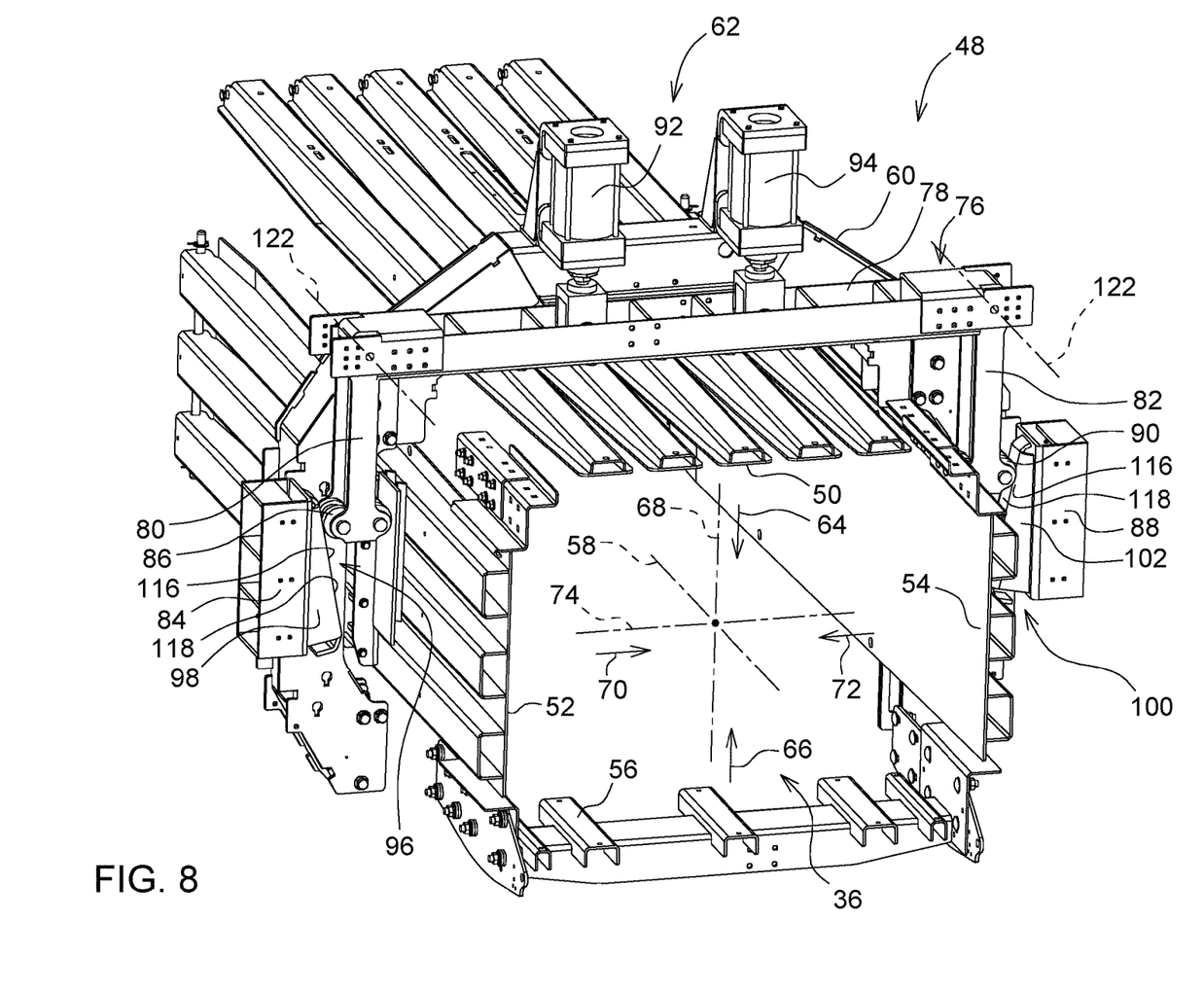
FIG. 8 is a schematic perspective view of a third embodiment of the wedging system of the baler implement.
Figure 9:
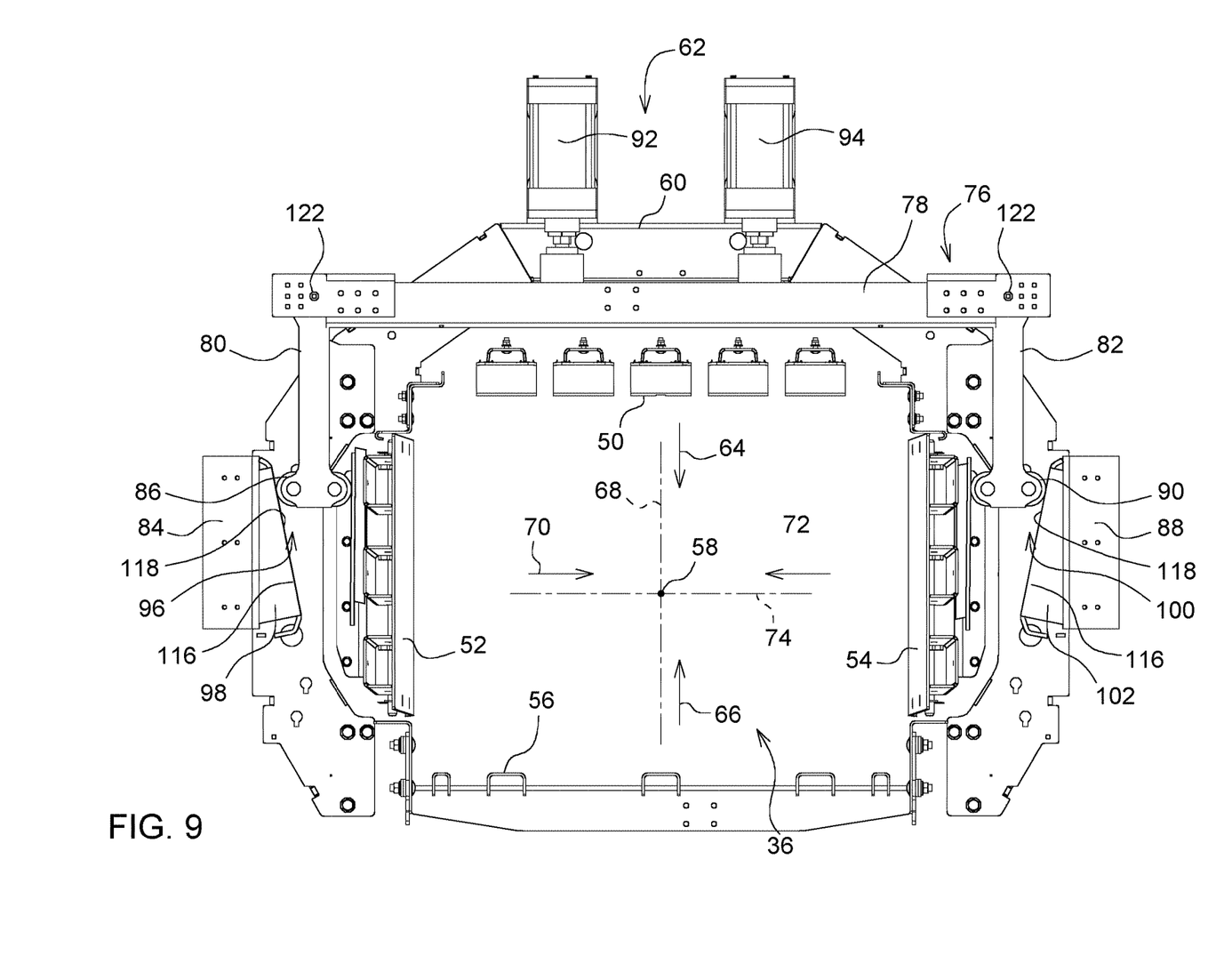
FIG. 9 is a schematic side view of the wedging system shown in FIG. 8.

Referring to FIGS. 8 and 9 a third implementation of the first wedging system 96 is generally shown. In the implementation shown in FIGS. 8 and 9, the wedge 98 of the first wedging system 96 includes a ramp 116 presenting a wedge surface 118 against which the first side portion 80 engages. The ramp 116 is attached to the first brace 84. The wedge surface 118 decreases a distance between the wedge surface 118 and the first side compression panel 52 in the first vertical direction 64 along the first compression axis 68. Relative movement between the first side portion 80 and the ramp 116 in the first vertical direction 64 along the first compression axis 68 moves the first side compression panel 52 in the first horizontal direction 70 along the second compression axis 74.

The first side portion 80 of the panel support structure 76 may include a ramp roller 120 rotatably attached to the first side portion 80 and positioned for engaging the wedge surface 118 of the ramp 116 in rolling engagement. As such, the ramp roller 120 may be disposed between and interconnect the ramp 116 and the first side portion 80 of the panel support structure 76. In this configuration, the first side portion 80 of the panel support structure 76 is rotatably connected to the top portion 78 of the panel support structure 76 by a rotatable connection 122 so that the first side portion 80 may pivot relative to the top portion 78 due to the interaction between the wedge surface 118 of the ramp 116 and the first side portion 80 as the panel support structure 76 moves along the first compression axis 68. Accordingly, due to the interaction between the ramp 116 and the first side portion 80, movement of the first side portion 80 in the first vertical direction 64 along the first compression axis 68 causes the first side portion 80 to move in the first horizontal direction 70 along the second compression axis 74. The first side portion 80 directly bears against the first side compression panel 52, thereby moving the first side compression panel 52 inward toward the central longitudinal axis 58 of the compression chamber 36.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A baler implement for forming a bale having a parallelepiped shape, the baler implement comprising:
   an upper compression panel and a first side compression panel extending along a central longitudinal axis of a compression chamber;
   a compression frame disposed around the upper compression panel and the first side compression panel, with both the upper compression panel and the first side compression panel moveable relative to the compression frame;
   a panel support structure having a top portion positioned proximate the upper compression panel and a first side portion attached to the top portion and positioned proximate the left side compression panel;
   an actuator interconnecting the compression frame and the panel support structure, wherein the actuator is operable to extend to move the panel support structure and the upper compression panel in a first vertical direction along a first compression axis;
   a first wedging system interconnecting the first side compression panel and the first side portion of the panel support structure, wherein the first wedging system includes a wedge operable to convert movement of the first side portion of the panel support structure in the first vertical direction along the first compression axis into movement of the first side compression panel in a first horizontal direction along a second compression axis.

2. The baler implement set forth in claim 1, further comprising a first brace attached to the compression frame and positioned adjacent to and outboard of the first side portion of the panel support structure relative to the central longitudinal axis of the compression chamber, wherein the first brace limits movement of the first side portion of the panel support structure in a second horizontal direction along the second compression axis.

3. The baler implement set forth in claim 2, wherein the first side portion includes a brace roller rotatably attached to the first side portion and positioned for rolling engagement against the first brace as the first side portion moves along the first compression axis.

4. The baler implement set forth in claim 1, wherein the wedge of the first wedging system includes a link interconnecting the first side portion and the first side compression panel.

5. The baler implement set forth in claim 4, wherein the link includes an outboard end pivotably coupled to the first side portion of the panel support structure, and an inboard end pivotably coupled to the first side compression panel.

6. The baler implement set forth in claim 5, wherein the link extends along a central link axis between the outboard end and the inboard end thereof, wherein the link axis is angled relative to both the first compression axis and the second compression axis.

7. The baler implement set forth in claim 6, wherein the inboard end of the link is positioned vertically lower than the outboard end of the link along the first compression axis.

8. The baler implement set forth in claim 4, wherein the first side portion of the panel support structure is rigidly attached to the top portion of the panel support structure.

9. The baler implement set forth in claim 1, wherein the wedge of the first wedging system includes a ramp presenting a wedge surface against which the first side portion engages, wherein relative movement between the first side portion and the ramp in the first vertical direction along the first compression axis moves the first side compression panel in the first horizontal direction along the second compression axis.

10. The baler implement set forth in claim 9, wherein the first wedging system includes a ramp roller disposed between and interconnecting the ramp and the first side portion of the panel support structure.

11. The baler implement set forth in claim 9, wherein the ramp is attached to the first side compression panel.

12. The baler implement set forth in claim 9, wherein the ramp is attached to the first brace.

13. The baler implement set forth in claim 12, wherein the first side portion of the panel support structure is rotatably connected to the top portion of the panel support structure.

14. The baler implement set forth in claim 1, further comprising a second side compression panel moveable relative to the compression frame.

15. The baler implement set forth in claim 14, wherein the panel support structure includes a second side portion attached to the top portion and positioned proximate the second side compression panel.

16. The baler implement set forth in claim 15, further comprising a second wedging system interconnecting the second side compression panel and the second side portion of the panel support structure, wherein the second wedging system includes a wedge operable to convert movement of the second side portion of the panel support structure in the first vertical direction along the first compression axis into movement of the second side compression panel in a second horizontal direction along the second compression axis.

17. The baler implement set forth in claim 1, wherein the actuator is positioned vertically above the upper compression panel and biases against the compression frame and the top portion of the panel support structure.

18. The baler implement set forth in claim 1, wherein the actuator includes a hydraulic cylinder operable to extend and retract in response to fluid pressure.

19. The baler implement set forth in claim 1, wherein the actuator is positioned to extend in a direction that is substantially transverse to the central longitudinal axis of the compression chamber in a substantially vertical orientation relative to the central longitudinal axis of the compression chamber.

* * * * *